R. B. & D. T. DAY.
TREATMENT OF HYDROCARBON MATERIALS.
APPLICATION FILED SEPT. 28, 1917.
1,280,179.
Patented Oct. 1, 1918.
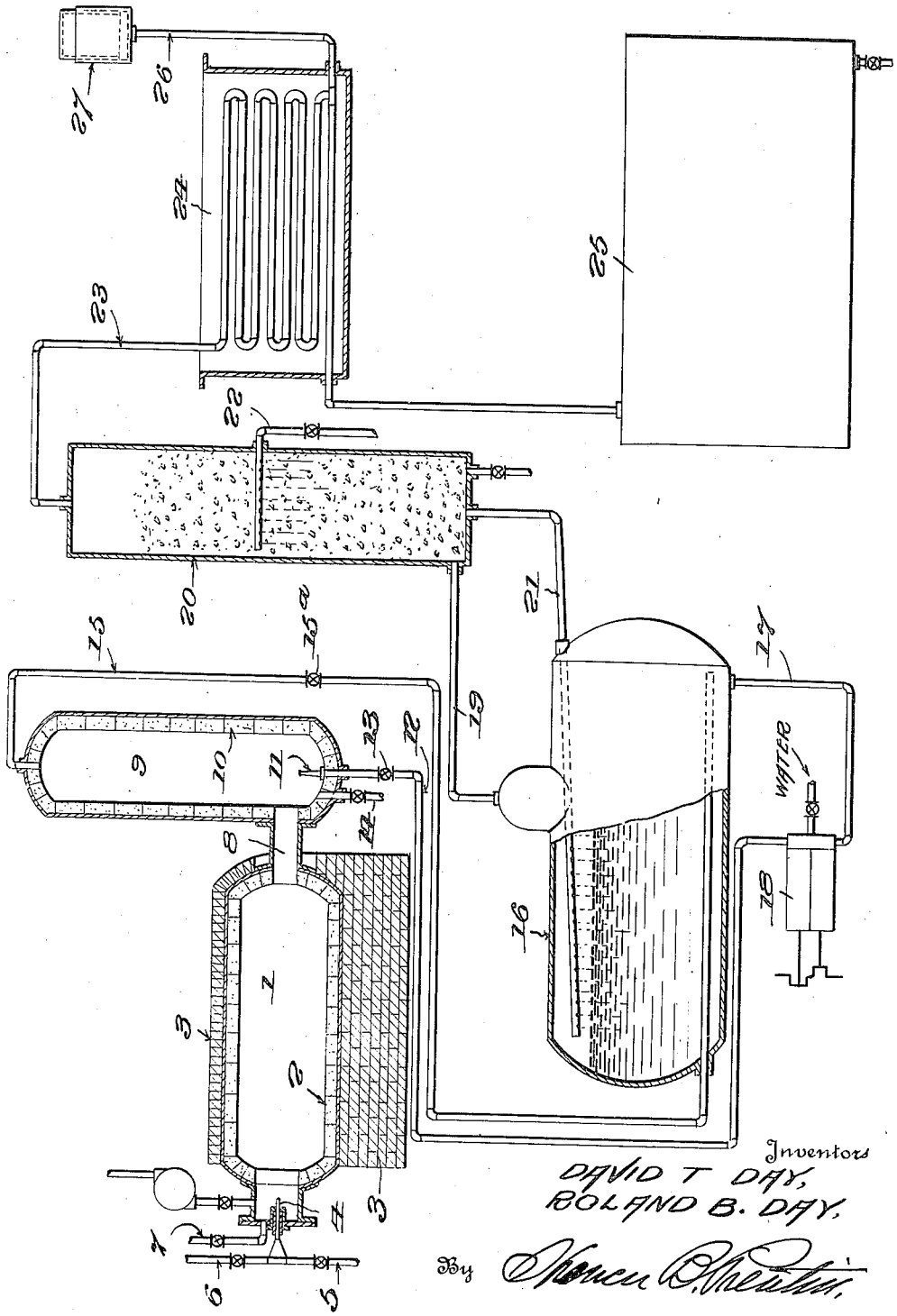
Inventors
DAVID T. DAY,
ROLAND B. DAY,
By
Attorney

UNITED STATES PATENT OFFICE.

ROLAND B. DAY, OF SWARTHMORE, PENNSYLVANIA, AND DAVID T. DAY, OF WASHINGTON, DISTRICT OF COLUMBIA.

TREATMENT OF HYDROCARBON MATERIALS.

1,280,179.  Specification of Letters Patent.  Patented Oct. 1, 1918.

Application filed September 28, 1917. Serial No. 193,742.

*To all whom it may concern:*

Be it known that we, ROLAND B. DAY and DAVID T. DAY, citizens of the United States, and residing at Swarthmore, in the county of Delaware and State of Pennsylvania, and at Washington, District of Columbia, respectively, have invented new and useful Improvements in the Treatment of Hydrocarbon Materials, of which the following is a specification.

This invention relates to the production of hydrocarbon oils having low boiling points from hydrocarbon oils having high boiling points. The invention includes the production of such light oils or those having low boiling points by treatment of vapors by gases of combustion under specified temperature and pressure conditions. The invention also includes the use of such products as may be obtained by the foregoing treatment while in a vapor state and their injection into a mass of oil in a still, otherwise unheated, and the heating and vaporization of this oil by such vapors. The invention provides for the condensation at specified temperatures of the vapors evolved and the trapping of the resultant light oils and fixed gases or other vapors not condensed at the temperatures given.

The invention provides a new and efficient method of vaporizing oil by heating the same by the injection of vapors produced by cracking with hot gases of combustion, and also the injection of the hot gases of combustion which may remain uncombined with the vapors so cracked.

The process is briefly described as follows. The vapors and gases produced by the cracking treatment by the gases of combustion under pressure above atmospheric pressure and at temperatures above 355° C. are injected into a mass of oil contained in a still or closed chamber which is at substantially atmospheric pressure and not subjected to any external application of heat. The vapors and gases so injected bubble up through the oil in the still and heat the same and at the same time carry off such additional vapors from the oil in the still as may be affected by the hot gases of combustion. The oil so treated is accordingly heated and may be used as the initial source of oil for the cracking chamber. The vapors escaping from the still are conducted through a condenser chamber filled with refractory material, such as stone. If gasolene is the final product desired all material condensing at 190° C. and below is trapped and led back to the still for further treatment, and all material not condensed at 190° C. is led through a second condenser and the resultant gasolene hydrocarbons conducted to a storage receptacle or refined.

The process dispenses with all ordinary and usual intermediate substances or methods for transferring heat by providing direct contact of the vapors to be cracked with the hot gases of combustion, and the injection of the resultant cracked vapors into a mass of otherwise unheated oil not under pressure.

Further features and advantages of the invention will be set forth in the following specification and claims.

Heretofore the production of low boiling point hydrocarbons has been brought about by the use of heat applied to the exterior of vessels containing the material to be cracked. In older forms the material to be cracked was treated in the form of a liquid by heat applied directly to the exterior of the container. More recently it has been found of advantage to vaporize the material to be cracked and then to apply heat to the exterior of the vessel or chamber containing the vapor.

The present process provides for the vaporizing of the material to be cracked and the conversion and cracking of the same by direct contact with hot gases substantially free from oxygen. The process includes the generation of gases of combustion by burning of oil in one part of the apparatus used, which will be described later, and the passing of the gases of combustion into another part of the apparatus where they act on the vaporized hydrocarbons to be treated. The cracking process begins as soon as the oil to be treated is completely vaporized. The oil, when vaporized, is acted upon directly by the hot gases of combustion, the heat transfer being from vapor to vapor without any intervening medium. The use of hot gases of combustion is of advantage over other forms of heat and over other forms of hot vapor because such gases contain a minimum amount of oxygen and as used in this process come directly from the point of combustion with a very slight loss of heat. Any hydrogen present is of assistance in reducing the proportion of unsaturated hydrocarbons in the final product and thus making possible the use of much material which otherwise would be unsaturated and therefore worthless.

The use of the present process makes it possible to clean the inner walls of the cracking chamber by burning the carbon therefrom. As soon as air or oxygen is allowed to enter the cracking chamber the burning action takes place immediately and for this reason the process is conducted without the presence of oxygen. In cleaning the apparatus, in other types of appartus at present in use, it is necessary to stop work, allow the structure and machinery to cool down and to open the cracking chamber before the same may be cleaned. In the present invention, however, the burning of the carbon which may be formed is accomplished by the introduction of sufficient oxygen or air, the burning practically taking place automatically and without the necessity of stopping work to allow the parts to cool sufficiently before the opening of the same. In ordinary operation of the invention the parts need not be opened for long periods.

The invention relates to the production also of gasolene hydrocarbons and other oils having lower boiling points and provides for the use of temperature ranges from 355° C. up to 1650° C. and pressures in the apparatus ranging from atmospheric pressure up to 600 pounds per square inch.

In addition to the above explanation of the process used for cracking oil vapors by contact with gases of combustion, the invention provides for the injection of the vapors and gases taken from the cracking chamber into the mass of oil in the bottom of the still whereby the oil vapors bubble up through the oil in the still and carry off any light oils or volatile material which is affected by the heat derived from the vapors or gases so injected. The process provides for the continuous operation by preheating the original oil in this manner in the still without the application of heat or pressure to the exterior of the oil or still. The continuous process is further assisted by the utilization of the original oil in the condenser or stone tower where the hot vapors rising from the still are fractionated and condensed. The crude oil or original oil to be treated is pumped into the tower and assists in the condensation of the hot vapors and takes up heat therefrom and accordingly gives off the more volatile portions of its content. The oil then is led into the mass of oil in the still where it is further heated, and from the still the liquid oil is conducted to the base of the cracking chamber where it is vaporized and cracked. If the process is to be operated to obtain gasolene hydrocarbons the temperature at the outlet end of the stone tower is maintained at 190° C. so that materials condensing at this point or lower will be led back again to the oil still, and all vapors not condensed at this temperature will be led to a second condenser and condensed to obtain gasolene or the other desired product.

The process provides the steps for obtaining gasolene from the crude or original oil by utilizing to the highest degree all of the possible useful content of the original oil. In the operation of the process, substantially nothing but gasolene may be taken out after the crude oil is pumped into the apparatus, and in this respect the process is substantially contiuous. The process provides means for refining and cracking oils in a single apparatus and by the use of practically only one fire or source of heat, thus cutting the cost of distilling and cracking.

Referring to the accompanying drawing which illustrates one form of apparatus which may be used in the operation of the process 1 represents a combustion chamber of suitable metal which preferably is tested for pressure of at least 600 pounds and is lined on the inside with fire brick 2. An outer covering may be provided by ordinary red brick as indicated at 3 according to the conditions and the mounting desired for the combustion chamber. 4 represents a mechanical spray for injecting oil or oil and steam which may be admitted from the pipes 5 and 6 respectively. An additional pipe 7 is provided for admitting air to the combustion chamber at a point relatively near the spray 4 so that the combustion may be facilitated. Leading from the chamber 1 is an outlet passage 8 connecting the cracking chamber 9. This last mentioned chamber should be tested also to a pressure of at least 600 pounds and preferably lined with fire brick 10. At the base of the cracking chamber 9 is a mechanical spray 11 for injecting the oil or other material to be cracked. Pipe 12 having valve 13 is connected to the injector 11 for the supply of oil and water. At the immediate base of the chamber 9 is an outlet drain 14 for draining unvaporized portions and residues which may not pass out in the form of vapor. Leading from the top of the chamber 9 is a pipe 15 which constitutes a vapor line leading from the cracking chamber to an oil still 16. The end of the vapor line 15 is perforated and normally covered by the mass of oil within the still. The hot vapors distributed by means of the pipe 15 bubble up through the oil and carry off the light vapors from the oil and the heavy oil remains in the still. Likewise, the oil in the still tends to condense certain portions of the vaporous material passing through the pipe 15, as will be clear from the fact that the temperature of the oil in the still will be lower than the temperature of the gases and vapors taken from the combustion chamber and cracking chamber.

Leading off from the bottom of the still 16 is a pipe 17 communicating with an oil pump 18 used for pumping oil or oil and water in specified amounts to the pipe 12 connected to the injector member 11. Rising from the top of the still 16 is a pipe 19 leading to a stone tower 20 where the hot vapors rising from the still are fractionated and condensed so that only gasolene is allowed to pass into the condenser as will be described. Any material condensing in the tower will be led back from the base thereof through a pipe 21 to the oil within the still 16. The original supply of oil, such as crude oil, is forced through a pipe line connection 22 into the tower 20 and is permitted to trickle down through the refractory material therein, such as stone, and is there adapted to be heated and also to have a portion of its volatile content distilled off by the hot vapors and gases passing upwardly through the tower. Any oil so trickling down through the tower toward the bottom is also conducted to the still 16 through the pipe 21. The temperature at the outlet end or upper end of the tower is maintained at 190° C. Any vapors passing through the tower are led off from the same through the vapor line 23 into a condenser box 24 in which the vapor line 23 is provided with a plurality of coils. In this condenser box the gasolene vapors are condensed. At the discharge end of the condenser box 24 the condensed liquid material is led to a trap or storage receptacle 25 and the permanent gases are conducted upwardly through a pipe 26 to a storage tank 27. The apparatus is provided with a valve 15ᵃ located in the vapor line 15 for holding pressure in the cracking chamber and preventing the rise of pressure in the still 16. The pump 18 is preferably designed to pump predetermined proportions of oil and water and has adjustable means for varying the relative amounts of the oil or water.

What we claim is:

1. The process of producing hydrocarbon oils having low boiling points from hydrocarbon oils having high boiling points which consists in vaporizing the material to be treated, subjecting said vaporized material to a heat and pressure treatment in contact with hot gases of combustion subtantially devoid of oxygen whereby said vapors are cracked and conversion effected, introducing the material so treated into a body of oil contained in a receptacle, permitting the material to bubble up through the mass of oil to heat the latter and carry off part of its content, condensing at a temperature of at least 190° C. the vapors so discharged from the body of oil, and condensing in a second condenser the vapors not condensed at 190 C.

2. The process of producing hydrocarbon oils having low boiling points from hydrocarbon oils having high boiling points which consists in vaporizing the material to be treated, subjecting said vaporizing material to a heat of at least 355° C. and to a pressure greater than atmospheric pressure by contact with hot gases of combustion substantially devoid of oxygen whereby said vapors are cracked and conversion effected, introducing the material so treated into a body of oil contained in a receptacle, permitting the material to bubble up through the mass of oil to heat the latter and carry off part of its content, condensing at a temperature of at least 190° C. the vapors so discharged from the body of oil, and condensing in a second condenser the vapors not condensed at 190° C.

3. The process of producing hydrocarbon oils having low boiling points from hydrocarbon oils having high boiling points which consists in vaporizing the material to be treated, subjecting said vaporized material to a heat and pressure treatment in contact with hot gases of combustion substantially devoid of oxygen whereby said vapors are cracked and conversion effected, introducing the material so treated into a body of oil not otherwise heated, permitting the material to bubble up through the mass of oil to heat the latter and carry off part of its content, condensing at a temperature of at least 190° C. the vapors so discharged from the body of oil, and condensing in a second condenser vapors not condensed at 190° C.

4. The process of producing hydrocarbon oils having low boiling points from hydrocarbon oils having high boiling points which consists in vaporizing the material to be treated, subjecting said vaporized material to a heat of at least 355° C. and to a pressure greater than atmospheric pressure by contact with hot gases of combustion substantially devoid of oxygen whereby said vapors are cracked and conversion effected, introducing the material so treated into a body of oil not otherwise heated, permitting the material to bubble up through the mass of oil to heat the latter and carry off part of its content, condensing at a temperature of at least 190° C. the vapors so discharged from the body of oil, and condensing in a second condenser the vapors not condensed at 190° C.

5. The process of producing hydrocarbon oils having low boiling points from hydrocarbon oils having high boiling points which consists in vaporizing the material to be treated, subjecting said vaporized material to a heat and pressure treatment in contact with hot gases of combustion substantially devoid of oxygen whereby said vapors are cracked and conversion effected, introducing the material so treated into a body of oil not otherwise heated and at substantially atmospheric pressure, permitting the material to bubble up through the mass of oil to heat the latter and carry off part of its content, condensing at a temperature of at least 190° C. the vapors so discharged from the body of oil, and condensing in a second condenser the vapors not condensed at 190° C.

6. The process of producing hydrocarbon oils having low boiling points from hydrocarbon oils having high boiling points which consists in vaporizing the material to be treated, subjecting said vaporized material to a heat of at least 355° C. and to a pressure greater than atmospheric pressure by contact with hot gases of combustion subtantially devoid of oxygen whereby said vapors are cracked and conversion effected, introducing the material so treated into a body of oil not otherwise heated and at substantially atmospheric pressure, permitting the material to bubble up through the mass of oil to heat the latter and carry off part of its content, condensing at a temperature of at least 190° C. the vapors so discharged from the body of oil, and condensing in a second condenser the vapors not condensed at 190° C.

7. The continuous process of producing hydrocarbon oils having low boiling points from hydrocarbon oils having high boiling points which consists in vaporizing the original oil material to be treated, subjecting said vaporized material to a heat and pressure treatment and contact with hot gases of combustion in a container whereby said vapors are cracked and conversion effected, introducing the resultant vaporous and gaseous material so produced into a body of oil contained in a second container, permitting the material to bubble up through the mass of oil to heat the latter and carry off part of its content, condensing in a third container the vapors so discharged from the body of oil at a temperature of at least 190° C., introducing the fresh oil into the third container to be heated and to act as a condensing agent, conducting fresh oil from said third container to the mass of oil in said second container to be further heated by the injected material from said first container, and conducting the oil from said second container to said first container to be vaporized and cracked.

8. The continuous process of producing hydrocarbon oils having low boiling points from hydrocarbon oils having high boiling points which consists in vaporizing the original oil material to be treated, subjecting said vaporized material to a heat and pressure treatment and contact with hot gases of combustion in a container whereby said vapors are cracked and conversion effected, introducing the resultant vaporous and gaseous material so produced into a body of oil contained in a second container not otherwise heated, permitting the material to bubble up through the mass of oil to heat the latter and carry off part of its content, condensing in a third container the vapors so discharged from the body of oil at a temperature of at least 190° C., introducing the fresh oil into the third container to be heated and to act as a condensing agent, conducting fresh oil from said third container to the mass of oil in said second container to be further heated by the injected material from said first container, and conducting the oil from said second container to said first container to be vaporized and cracked.

9. The process of producing hydrocarbon oils having low boiling points from hydrocarbon oils having high boiling points which consists in vaporzing the material to be treated, subjecting said vaporized material to a heat and pressure treatment in contact with hot gases of combustion substantially devoid of oxygen whereby said vapors are cracked and conversion effected, introducing the material so treated into a body of oil not otherwise heated, permitting the material to bubble up through the mass of oil to heat the latter and carry off part of its content, and condensing the vapors so discharged.

10. The process of producing hydrocarbon oils having low boiling points from hydrocarbon oils having high boiling points which consists in vaporizing the material to be treated, subjecting said vaporized material to a heat and pressure treatment in contact with hot gases of combustion substantially devoid of oxygen whereby said vapors are cracked and conversion effected, introducing the material so treated into a body of oil not otherwise heated and at substantially atmospheric pressure, permitting the material to bubble up through the mass of oil to heat the latter and carry off part of its content, and condensing the vaporous material so discharged.

11. The process of producing hydrocarbon oils having low boiling points from hydrocarbon oils having high boiling points which consists in forming hot gases of combustion substantially devoid of oxygen and having a temperature of at least 355° C., introducing the hot gases into a body of oil not otherwise heated, permitting the gases to bubble up through the oil to heat the latter and carry off part of its content as vapor, and condensing the vapors so discharged.

12. The process of producing hydrocarbon oils having low boiling points from hydrocarbon oils having high boiling points which consists in forming hot gases of combustion substantially devoid of oxygen and having a temperature of at least 355° C., 5 introducing the hot gases into a body of oil not otherwise heated and at substantially atmospheric pressure, permitting the material to bubble up through the mass of oil to heat the latter and carry off part of its content, and condensing the vapors so discharged.

In testimony whereof we affix our signatures.

ROLAND B. DAY.
DAVID T. DAY.